Patented Jan. 4, 1927.

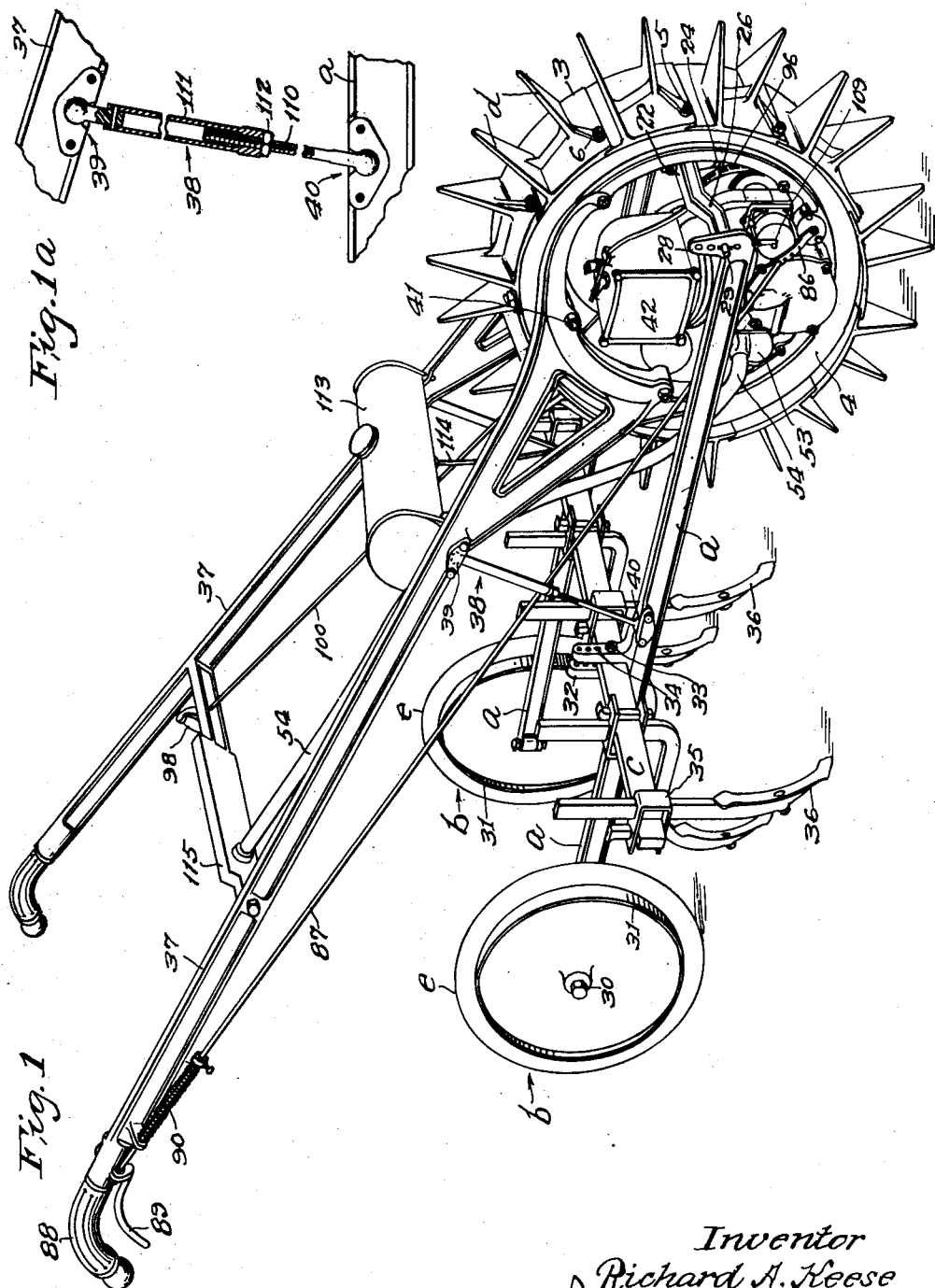

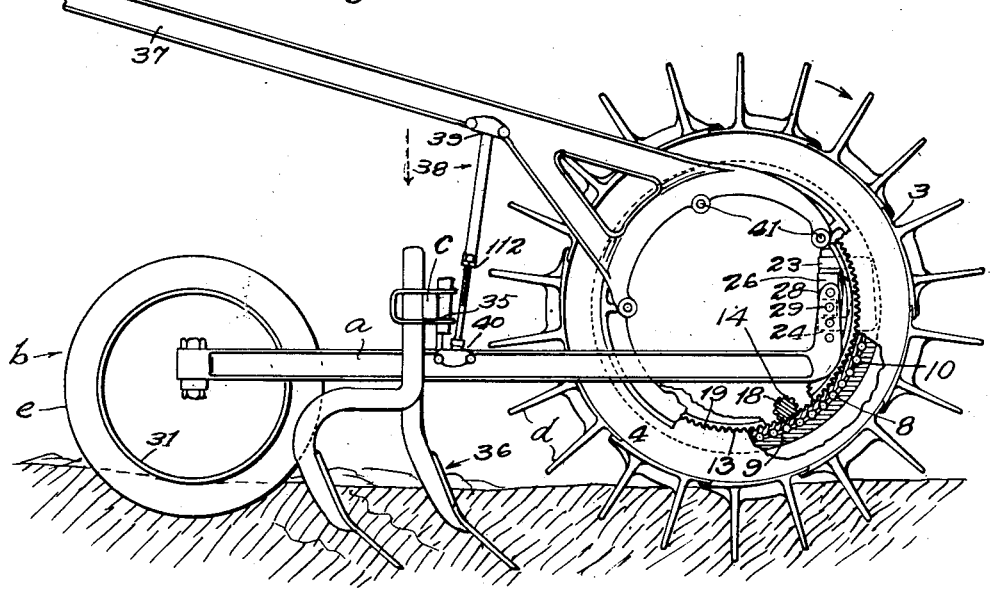
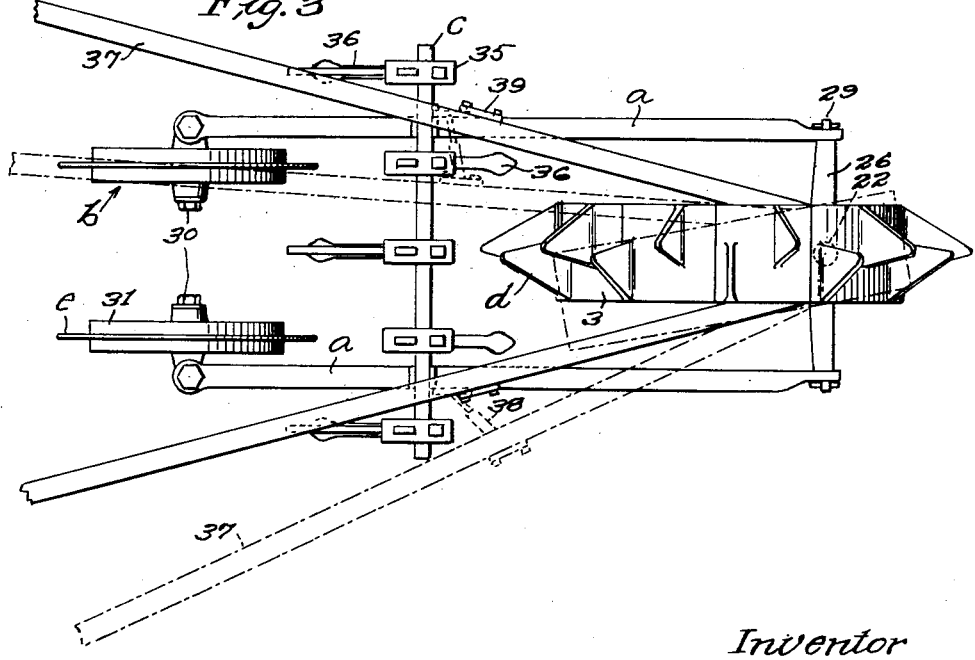

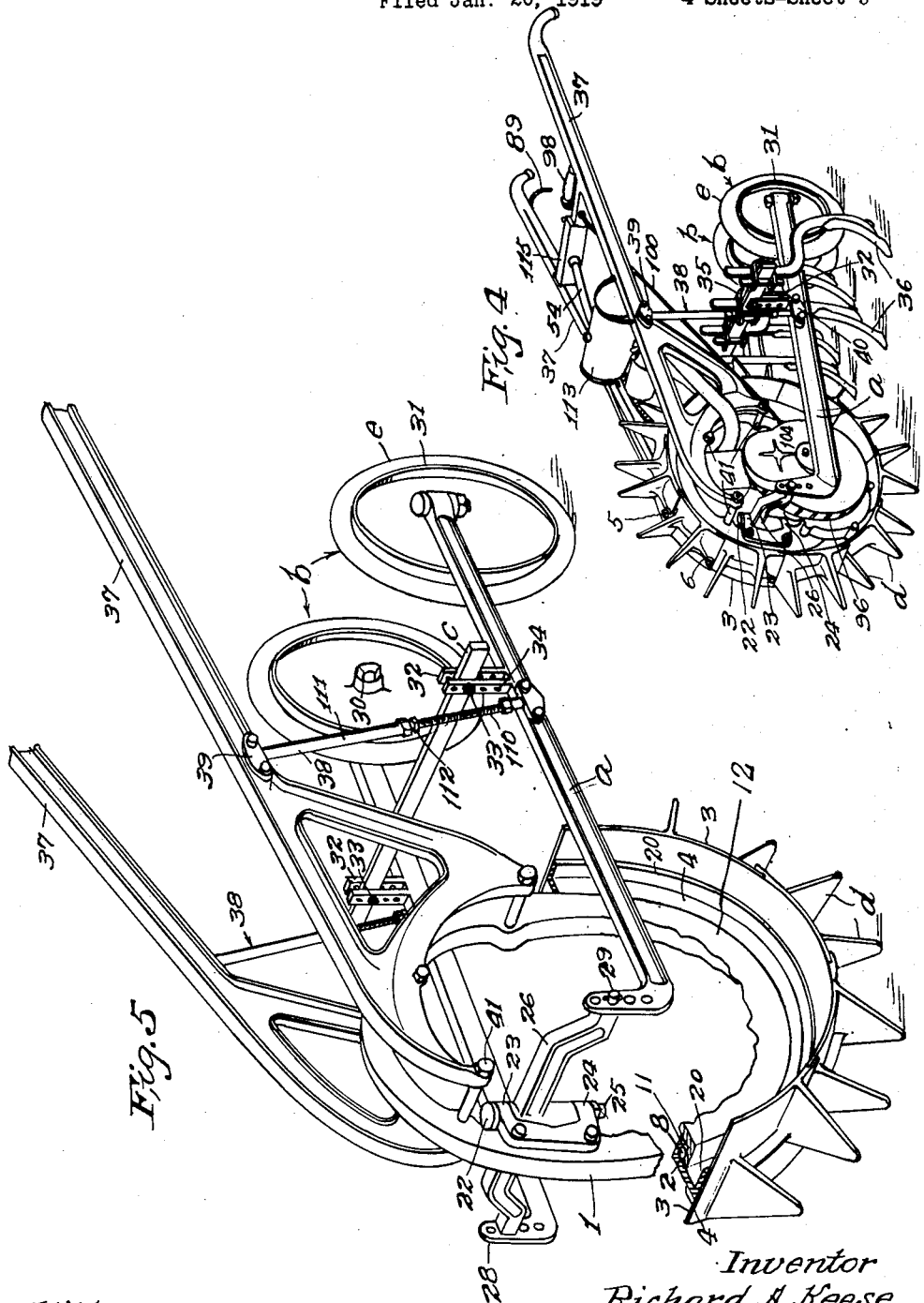

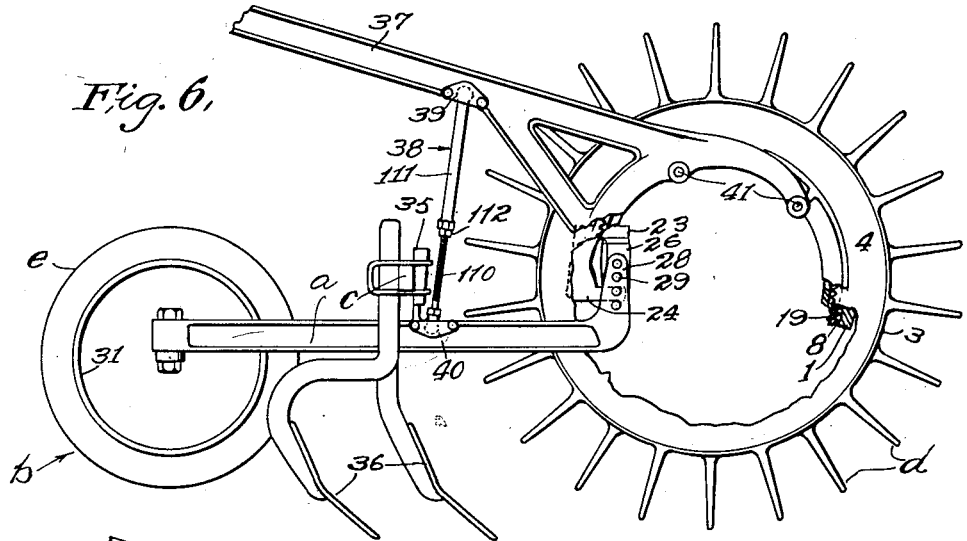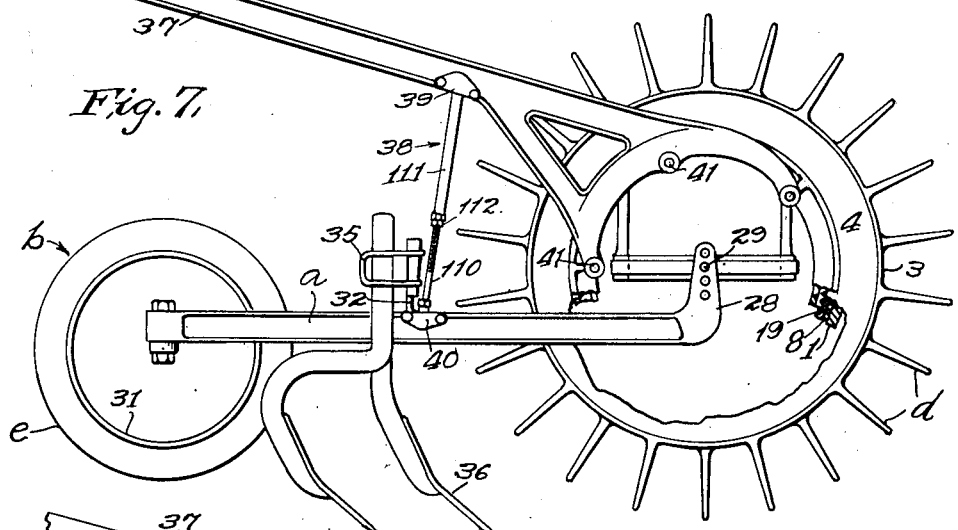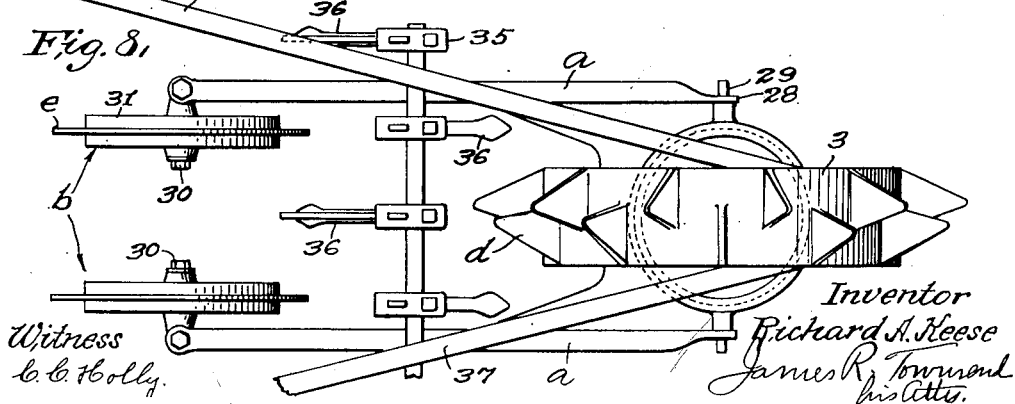

1,612,823

UNITED STATES PATENT OFFICE.

RICHARD A. KEESE, OF LOS ANGELES, CALIFORNIA.

MOTOR CULTIVATOR.

Application filed January 20, 1919. Serial No. 272,215.

This invention relates to propelling means applicable in making cultivators operable by their own power, and an object is to produce a cultivator tractor of this type which will be superior to other tractors for cultivators in the following particulars viz:

Light weight for given horsepower; ease of handling; adaptability to closely planted crops, for working between the rows; prevention of dust and dirt entering the working parts; minimizing friction between the working parts; compactness; reliability in operation; low fuel consumption; low cost of manufacture and upkeep.
Other objects and advantages are simplicity, cheapness, strength of parts, maximized drawbar pull for a given weight of tractor, and minimized attention.

Another object is to provide a cultivator tractor in which proper oiling is made practically certain by the operation of the machine.

In carrying out this invention I have provided a novel motor unit having suitable gear reduction to make it practical for slow speed heavy draft.

The invention comprises the tractive element or unit and various parts and combinations of parts adapted to the specific work in hand; but it is understood that various features of the invention may be applicable to other uses where the tractive element may be employed without departing from the spirit of this invention.
An object is to provide a superior novel utility with respect to the dirigible character of tractor cultivators.

Other objects, advantages and features of discovery and invention may appear from the accompanying drawings, the subjoined detail description and the appended claims.

This invention may be carried out in various ways.

The accompanying drawings illustrate the invention in a form I at present deem most desirable.

Figure 1 is a right side perspective of the motor cultivator ready for use.

Fig. 1ª is an enlarged fragmental sectional detail of one of the torque resisting extensible oscillating links that connect the reach bars and the handles for the purpose of raising and lowering the ground working implements.

Fig. 2 is a fragmental right side elevation of the cultivator, parts being broken away to expose interior construction. The motor is omitted.

Fig. 3 is a fragmental diagrammatic plan with broken lines indicating the swivel action.

Fig. 4 is a reduced left side perspective.

Fig. 5 is an enlarged fragmental perspective of the annulus and a portion of the tractor wheel. The swivelbar, reaches, trailer wheels and fragments of the handles are also shown.

Fig. 6 is a fragmental right side elevation of a form of the invention in which the swivelbar is pivoted at the rear side of the tractor wheel.

Fig. 7 is a view analogous to Fig. 6 showing the sheave swivelbar connection between the engine frame and the reach.

Fig. 8 is a fragmental plan of the form shown in Fig. 7.

The supporting frame in the form shown is constructed with a main frame comprising a reach formed of two bars $a$ having runners $b$ at one end adapted to rest on the ground, thereby supporting said ends. Said frame is also provided with a swivel bar which is shown as a cross-bar $c$ rigidly holding the reach bars $a$ in fixed relation to each other.

The motor frame comprises an annular member in the form of a flanged annulus 1, having an annular channel 2, on one side and mounted inside the annular broad tread 3, by antifriction means carried by an annular double flange web 4, fastened to said tread by suitable means as the bolts 5 in bosses 6, 7, that respectively reinforce the member 1 and the outer lateral flange of said web 4. The inner lateral flange of the web extends into the channel 2 and is secured therein by means of the bearing elements shown as balls 8 in the annular cooperating raceways 9, 10, which are provided respectively in the inner side of the outer wall of the motor frame and the outer side of the inner flange of the web and form the antifriction bearing race. The annular motor frame member 1 and web 4 make a practical housing for said raceways and antifriction balls, and said housing is closed by annular lubricant retaining and dust excluding rings 11 and 12.

The motor may be of any desired type and is combined with and rigid to frame 1 which encircles the motor.

The inner face of the flanged web 4 is provided with the internal gear teeth 13 meshing with the teeth 14 of the final pinion 18 of a train of driving gears, including a pinion 18 which meshes with the internal gear 19 that is formed by the inner flange of the web 4. Said train and motor may be of any desired construction and are practically contained within the annular tread 3, to which the outer flange 20 of web 4 is fastened.

The antifriction means are arranged to allow revolution of the tread on a horizontal axis that is in fixed relation with the motor frame which comprises the annular member 1 and the crank case of the engine. A vertical axis 22 is mounted within the tractive element and is in fixed relation to the motor frame and is shown as a king bolt extending through motor frame bracket arms 23, 24, and secured by cotter pin 25.

The motor is connected by its frame and said train to revolve the tread around said horizontal axis while the vertical axis is held upright.

The transverse oscillating swivel bar 26 is journaled on the vertical axis and constitutes a swivel connection between the tractive element and the parts to be drawn thereby.

In the drawing such parts are shown as an implement frame with wheels and chisels fastened to the main frame and resting on the ground.

The main frame shown comprises reach bars $a$ having clevises 28 at their front ends pivotally connected to the transverse draw bar by horizontal pins 29. Said reaches $a$ are shown as connected at their rear ends to horizontal coaxial stub axles 30 on which are journaled supporting wheels $b$ having annular threads 31 that rest upon the ground and constitute runners for the reaches. Said axles constitute fulcrums on which the reach bars are adjustable to different inclinations by adjusting the clevises 28 on the pins 29.

The reach bars $a$ are shown as being provided with supports 32 adapted by pins 33 in holes 34 to adjustably support the draft bar $c$ to which the devices or implements to be drawn by the tractor are secured, by clips 35.

In the form illustrated the cultivator implements 36 are shown clamped to the draft bar and it is understood that any form of implements or other devices adapted to be drawn by the tractive element may be connected to the reaches through said draft bar or otherwise as may be found desirable.

The draft bar rigidly braces the reaches to in part form therewith a rigid main frame. The swivel bar 26 is the front member of such frame and is rigid in its transverse relation to the reaches although it is in such pivotal relation thereto as to allow such up and down oscillations of the reaches $a$, wheels 31, and implements 36 as are required for adjustment relative to the handles 37 that are connected to said reaches $a$ by adjustable links 38 with ball and socket joints 39, 40. The handles are rigidly connected to the motor frame by suitable means as the bolts 41 engaging the annulus, so that although the handles are upheld by the links 38 they may be oscillated to turn the tractive element on the vertical axis 22 as on a pivot, so that when the handle is turned to one side or the other the tread will be likewise turned and thus the direction of travel may be changed.

The implement frame controlling and handle supporting means comprising the parallel links 38 are connected to the handle by loose joints 39 indicated as ball and socket joints, and extend down to the implement frame to which they are connected by like loose joints 40. There are two parallel links thus constructed and connected, and two handle members 37 and two side bars $a$ for the main frame. The parallel links connect the handle members of the opposite sides, to the frame members directly below them, respectively.

By this arrangement and construction, the operator, by lifting upon the handles may raise the implement from the ground; and by sluing the handles to one side or the other, the tread will be turned in the direction desired without resistance from the implement frame. By this construction and arrangement the ease and facility of guiding the tread is greatly increased over former constructions. The main frame follows the tractive tread freely but does not interfere with changing the direction thereof within practical working limits.

The tread is provided with grousers $d$ to dig into the soft ground; and the rear end of the main frame is preferably provided with the supporting wheels or runners $b$ that are provided, respectively, with external annular webs or flanges $e$ which are shown as projecting centrally from the tread of the runners. By this construction the rear end of the main frame is held from sluing under pressure of the implement upon the ground; thus holding the implement in true course irrespective of the differences in hardness of the ground at one or the other side of the vertical midplane of the implement.

The motor at present deemed advisable for use in this tractor is an internal combustion engine as indicated in Fig. 1 as comprising a cylinder 42, and other elements which are not shown as they constitute parts of a well known form of construction.

The carbureter 53 is supplied with air through a pipe 54 carried by the handles.

The clutch lever 86 is connected to a clutch rod 87 that is led up to near the grip 88 of the handle 37, and is controlled by the grip lever 89 carried by said handle. The clutch is held in engagement by the clutch spring 90 and is released by operating the grip 89. 96 is a centrifugal fan for cooling the cylinder 42.

The starter handle 98 is connected to a cable not shown that is carried by a guide 100 on the handle 37 within reach of the left hand of the operator; said cable is led to a starting mechanism not shown which is within the flywheel housing 104.

In practical operation when the engine is running and the parts are in gear, the torque of the motor tends to revolve the annular tread in the direction of the solid curved arrow. Such tendency is resisted by engagement of the grousers with the ground. In proportion to the resistance of the ground to the grousers, there is a reactionary torque set up by the motor and transmitted to the motor frame tending to revolve the motor frame and its attached handles in the direction of the dotted curved arrow. The torque of the motor applied through the grousers to the ground tends to produce a forward movement of the tractor which tendency is resisted by the draft of the ground working implements. When the ground working implements are properly adjusted, their resistance to forward movement through the ground produces an upwardly directed vertical component of force which acts on the implements 36 and is transmitted through the implements to the reach. The magnitude of this force is equal to the magnitude of the force tending to revolve the motor frame and the attached handles in the direction of the dotted curved arrow.

These forces balance one another through the function of the vertical stay attached between the reach and the handles, and there are no remaining forces to cause down draft upon the handles or upon the trailer wheels or runners.

In practical operation it is not always possible to adjust the implements to the proper angle of engagement with the ground and there is a minor unbalanced force which together with the weight of the implements and handles is carried by the trailer wheels or runners b.

The peripheral or vertical blades e are sunk into the ground by this force until the horizontal runner tread 31 is supported by the ground.

While the grip lever 89 is released, the tractor advances and the operator may easily guide the same by simply oscillating the handles laterally as may be requisite to head the tread 3 in the direction desired.

To stop the tractor's travel, the lever 89 is gripped by the hand of the operator thus disengaging the clutch.

The engine may be stopped by any conventional means, as by grounding the magneto circuit at switch 109.

The height of the grips 88 of the handle is made adjustable by means of the adjustable stays which are each formed of two telescopic sections 110, 111 threaded together and secured in their adjustment by jam nut 112.

The gasoline tank 113 is mounted on the handle 37 and is connected by the tube 114 with the carbureter 53. The air admitted to the air intake tube 54 of the carbureter is supplied to said intake tube through a dust separator 115 of any suitable form.

I claim:

1. The combination with a main frame of runners connected to the main frame; a tractor wheel; a motor frame within the tractor wheel; a motor carried by the motor frame and connected to drive the tractor wheel; means swiveling the motor frame to the front end of the main frame on an axis vertical to the main frame; said main frame being adapted to have ground working implements connected thereto; and handle means in swiveled relation to the front end of the main frame and rigidly connected to the motor frame adapted to raise and lower the runners and the main frame and to turn the traction wheel for the purpose of guiding the same.

2. A tractor cultivator comprising a tractive element; a motor frame within the tractive element and on to which the tractive element is constructed to revolve; a motor encircled by, and fixed to the motor frame and arranged to drive said tractive element; a main frame adapted to have a ground working implement connected thereto so as to engage the ground; and means connecting said main frame to the motor frame and allowing only lateral oscillation of said motor frame and said tractive element relative to the main frame.

3. In a tractor cultivator, a tractive element; a motor connected to drive said element; a frame for said motor; a main frame; and means pivotally connecting the main frame to the motor frame and adapted to allow lateral oscillation only of the motor frame relative to the main frame, said pivotal connection being within the tractive element.

4. A tractor wheel; an annular motor frame; an annulus constituting a raceway between the tractor wheel and the motor frame; anti-friction means in the raceway; a motor to drive the tractor wheel mounted within the motor frame; and a main frame so connected to the motor frame as to allow lateral oscillation only, of the motor frame relative to the main frame.

5. A tractor wheel; a motor frame; an annulus constituting a raceway between the tractor wheel and the motor frame; anti-friction balls in the raceway; a motor to drive the tractor wheel; a main frame so connected within said wheel to the motor frame as to allow lateral oscillation only of the motor frame relative to the main frame.

6. A tractor cultivator comprising a tractive element; a motor connected to drive the same; a main frame pivotally connected to the tractive element within said element; a handle connected to turn the tractive element laterally; and oscillating connections connecting the main frame to the handle to support the handle.

7. A tractor cultivator comprising a tractive element; a motor connected to drive the same; a main frame pivotally connected to the tractive element within said element; a handle connected to turn the tractive element laterally; and extensible oscillating connections connecting the main frame to the handle to support the handle.

8. A tractor cultivator comprising an annular tread provided with grousers; a motor frame journaled within the tread; a reach connected to the motor frame, said motor frame being oscillatable relative to the reach, on a vertical axis; ground wheels at the rear of the reach; and oscillating stays connecting the motor frame with the reach intermediate the ends of the reach.

9. A tractor cultivator comprising a tractive element; a motor frame relative to which the tractive element is constructed to revolve; a motor fixed to the motor frame and arranged to drive said tractive element; a main frame adapted to have a ground working implement connected thereto; and means pivotally connecting said main frame to the motor frame and allowing only lateral oscillation of said motor frame and tractive element relative to the main frame. said pivotal connection being within the tractive element.

10. In a tractor cultivator, a tractive element; a motor connected to drive said element; a frame for said motor, said frame being within the tractive element and encircling said motor; a main frame; and means connecting the main frame to the motor frame and adapted to allow lateral oscillation only of the motor frame relative to the main frame.

11. A tractor wheel; a motor frame; an annulus constituting a raceway between the tractor wheel and the motor frame; anti-friction means in the raceway; a motor encircled by the motor frame and adapted to drive the tractor wheel and a main frame, so connected to the motor frame as to allow lateral oscillation only of the tractor wheel relative to the main frame, and having ground working implements adapted to engage the ground.

12. A tractor wheel; a motor frame; an annulus constituting a raceway between the tractor wheel and the motor frame; anti-friction balls in the raceway; a motor within the tractor wheel and encircled by the motor frame and adapted to drive the tractor wheel; a main frame so connected to the motor frame as to allow lateral oscillation only of the motor frame relative to the main frame.

13. A tractor cultivator comprising a tractive element; a motor connected to drive the same; a main frame connected to the tractive element; a handle connected to turn the tractive element laterally; and oscillating connections connecting the main frame to the handle to support the handle.

14. A tractor cultivator comprising a tractive element; a motor connected to drive the same; a main frame connected to the tractive element; a handle connected to turn the tractive element laterally; and extensible oscillating connections connecting the main frame to the handle to support the handle.

15. In a tractor cultivator, a tractive wheel; a motor frame; an annulus constituting a raceway between the tractor wheel and the motor frame; anti-friction means in the raceway; a motor to drive the tractor wheel; a main frame so connected to the motor frame as to allow lateral oscillation only of the motor frame relative to the main frame; handle means in swiveled relation to the front end of the main frame and in rigid relation to the motor frame and being adapted to turn the tractive wheel laterally; and oscillating connections connecting the main frame to the handle to support the handle.

16. In a tractor cultivator, a tractive wheel; a motor frame; an annulus constituting a raceway between the tractor wheel and the motor frame; anti-friction means in the raceway; a motor to drive the tractor wheel; a main frame so connected to the motor frame as to allow lateral oscillation only of the motor frame relative to the main frame; handle means in swiveled relation to the front end of the main frame and in rigid relation to the motor frame and being adapted to turn the tractive wheel laterally; and extensible oscillating connections connecting the main frame to the handle to support the handle.

17. A tractor cultivator comprising a tractive element; a motor connected to drive the same; a frame for said motor journalled within said tractive element; a main frame connected to the tractive element; and a handle in swiveled relation to the front end of the main frame and in rigid relation to the motor frame, and adapted to turn the tractive element laterally.

18. In a tractor cultivator; a tractive element; an annular motor frame on which the tractive element is adapted to rotate; a motor within the frame and fixed thereto and being adapted to drive the tractive element; a main frame connected to the motor frame; a handle connected to turn the tractive element laterally; and connections connecting the main frame to the handle to support the handle.

19. In a tractor cultivator, a tractive wheel, an annular motor frame within said wheel; a motor on said frame to drive said wheel; and a main frame pivotally connected to said motor frame within the annulus formed by the motor frame and adapted to allow lateral oscillation only of the motor frame relative to the main frame.

20. In a tractor cultivator, an annular tractive element, a motor to drive said element, and a main frame pivotally connected to said tractive element and adapted to allow lateral oscillation only of the main frame relative to the tractive element, the pivotal connection connecting said main frame to the tractive element being within the annulus formed by the tractive element.

In testimony whereof, I have hereunto set my hand at Los Angeles, California, this 14th day of January 1919.

RICHARD A. KEESE.